H. A. OBERBECK, Jr.
COMBINED MOTOR CAR AND HEARSE.
APPLICATION FILED FEB. 23, 1917.

1,255,920.

Patented Feb. 12, 1918.
2 SHEETS—SHEET 1.

WITNESSES:

INVENTOR.
Henry A. Oberbeck, Jr.
BY
HIS ATTORNEY.

H. A. OBERBECK, Jr.
COMBINED MOTOR CAR AND HEARSE.
APPLICATION FILED FEB. 23, 1917.
1,255,920.
Patented Feb. 12, 1918.
2 SHEETS—SHEET 2.
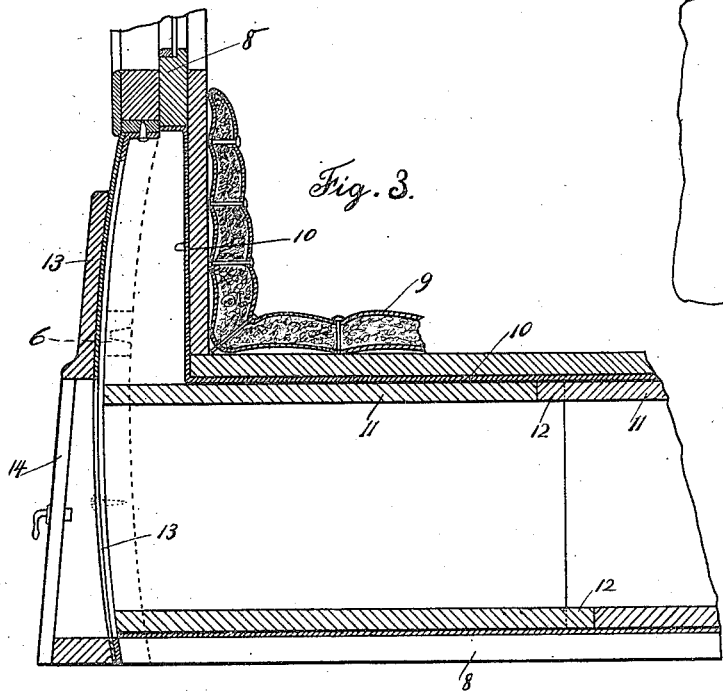
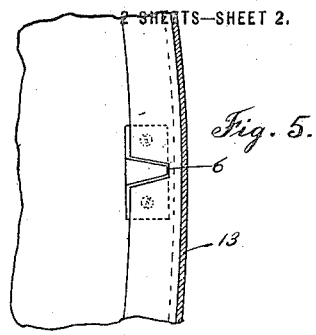
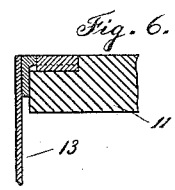
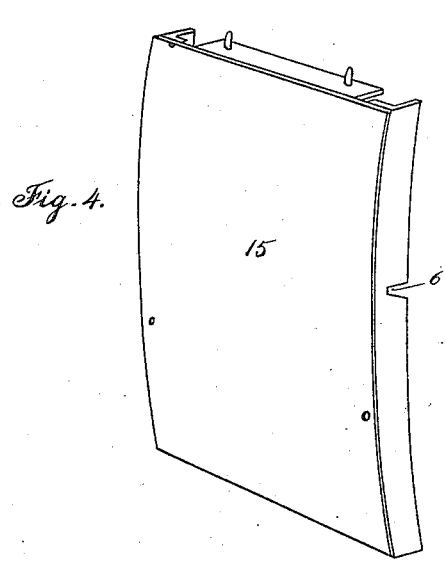
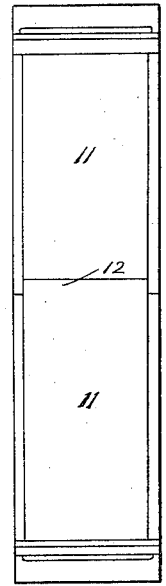
WITNESSES:
J. A. Klostermann.
B. J. Richards
INVENTOR.
Henry A. Oberbeck, Jr.
BY Joshua R. H. Potts
HIS ATTORNEY.

UNITED STATES PATENT OFFICE.

HENRY A. OBERBECK, JR., OF CHICAGO, ILLINOIS.

COMBINED MOTOR CAR AND HEARSE.

1,255,920.  Specification of Letters Patent.  Patented Feb. 12, 1918.

Application filed February 23, 1917. Serial No. 150,545.

*To all whom it may concern:*

Be it known that I, HENRY A. OBERBECK, Jr., a citizen of the United States, and a resident of the city of Chicago, county of Cook, and State of Illinois, have invented certain new and useful Improvements in Combined Motor Cars and Hearses, of which the following is a specification.

My invention relates to improvements in combined motor cars and hearses, and has for its object the provision of an improved construction of this character which is readily convertible and efficient in use.

The invention consists in the combinations and arrangements of parts hereinafter described and claimed.

Figure 1:
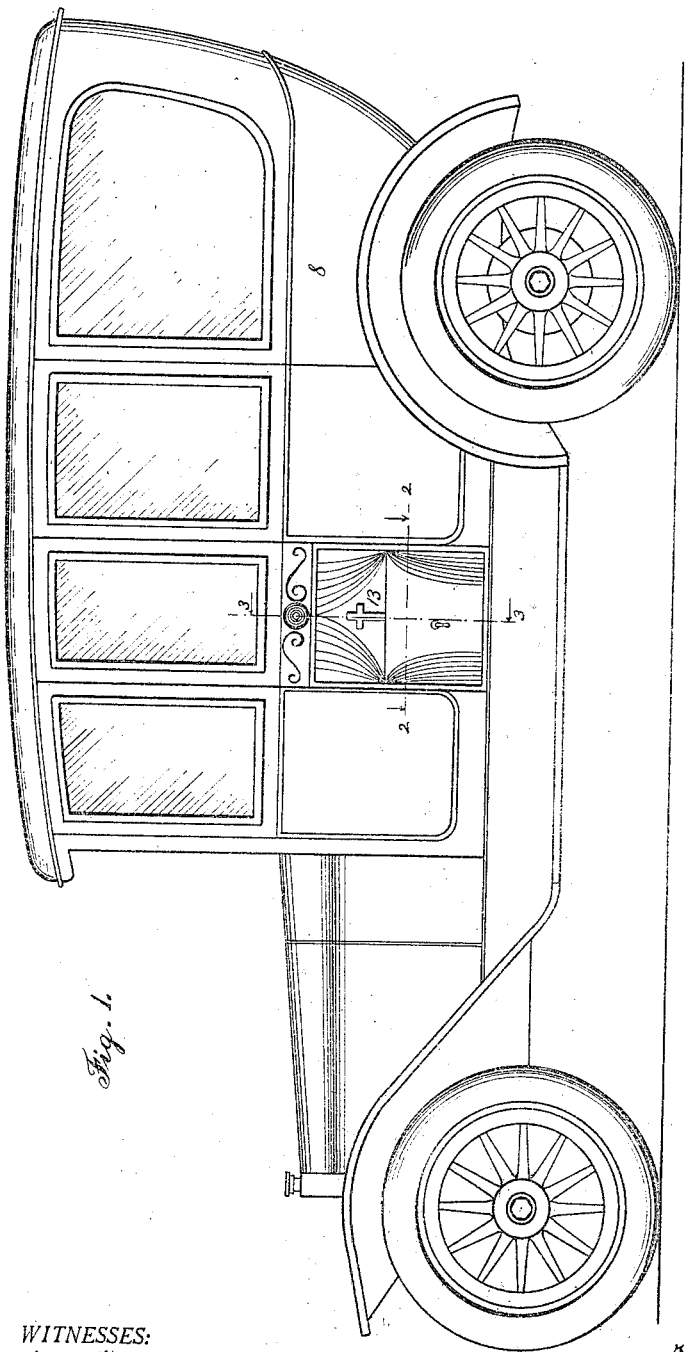
Figure 2:
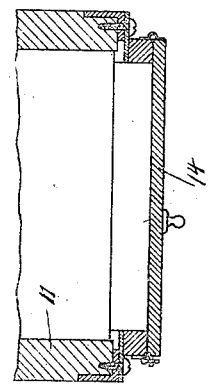

The invention will be best understood by reference to the accompanying drawings forming a part of this specification, and in which, Figure 1, is a side view of a vehicle, embodying my invention, Fig. 2, an enlarged section taken on line 2—2 of Fig. 1, Fig. 3, an enlarged section taken on line 3—3 of Fig. 1, Fig. 4, a perspective view of a substitute panel employed in the construction, Fig. 5, an enlarged detail section through the panel disclosed in Fig. 4 and showing the same in position of use, Fig. 6, an enlarged section taken through one edge of said panel, and Fig. 7, a top plan view, on a reduced scale, of a compartment employed in the construction.

The preferred form of construction as illustrated in the drawings comprises an automobile 8 of the limousine type and having an opening or passage extending transversely therethrough under the usual front seat 9 thereof. This opening or passage is completely lined with zinc 10 or other suitable metallic sealing material. A casket-containing compartment is arranged to be inserted or removed in said opening, said compartment consisting of two separable tubular parts 11, each of said parts having a tongue 12 at its inner end adapted to engage with a corresponding notch in the other. Each of said compartments also carries a panel 13 at its outer end arranged to constitute a portion of the vehicle body and provided with a door 14, giving access to said compartment. Readily removable and insertible panels 15 are arranged to be substituted for the panels 13 when the vehicle is not designed for use as a hearse. All of said panels are provided with notches 6 in their side flanges adapted to fit over suitable positioning lugs as indicated.

In use, when it is desired to employ the vehicle as a hearse, the panels 15 are removed and compartment parts 11 inserted as indicated, thus providing a compartment for the reception of a casket. When it is desired to employ the vehicle for ordinary purposes, the compartment parts 11 and panels 13 are removed, and panels 15 inserted in place, thus rendering the vehicle undistinguishable from an ordinary limousine automobile.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a vehicle having an opening extending transversely therethrough, of a compartment in said opening, said compartment being made in two tubular parts removable from opposite sides of the vehicle, substantially as described.

2. The combination with a vehicle having an opening extending transversely therethrough, of a compartment in said opening, said compartment being made in two tubular parts removable from opposite sides of the vehicle; and a panel at the outer end of each tubular part constituting a part of the corresponding vehicle side, substantially as described.

3. The combination with a vehicle having an opening extending transversely therethrough, of a compartment in said opening, said compartment being made in two tubular parts removable from opposite sides of the vehicle, there being interfitting tongues and notches at the inner ends of said parts; and a panel at the outer end of each tubular part constituting a part of the corresponding vehicle side, substantially as described.

In testimony whereof I have signed my name to this specification in the presence of two subscribing witnesses.

HENRY A. OBERBECK, JR.

Witnesses:
JOSHUA R. H. POTTS,
HELEN F. LILLIS.

Copies of this patent may be obtained for five cents each, by addressing the "Commissioner of Patents. Washington, D. C."